US008676239B2

(12) United States Patent
Hirai (10) Patent No.: US 8,676,239 B2
(45) Date of Patent: Mar. 18, 2014

(54) WIRELESS COMMUNICATION SYSTEM, WIRELESS COMMUNICATION DEVICE, AND WIRELESS COMMUNICATION METHOD

(75) Inventor: Hiroaki Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 257 days.

(21) Appl. No.: 13/202,771

(22) PCT Filed: Feb. 19, 2010

(86) PCT No.: PCT/JP2010/052542
§ 371 (c)(1),
(2), (4) Date: Aug. 23, 2011

(87) PCT Pub. No.: WO2010/095713
PCT Pub. Date: Aug. 26, 2010

(65) Prior Publication Data
US 2011/0306374 A1   Dec. 15, 2011

(30) Foreign Application Priority Data

Feb. 23, 2009  (JP) ................................. 2009-039858

(51) Int. Cl.
*H04B 15/00* (2006.01)
(52) U.S. Cl.
USPC ........................................................ 455/507
(58) Field of Classification Search
USPC ................................................ 455/507, 522
See application file for complete search history.

(56) References Cited

U.S. PATENT DOCUMENTS 6,496,496 B1 * 12/2002 Ramakrishna et al. ........ 370/342
2002/0049873 A1 * 4/2002 Mikuni et al. .................. 710/73

(Continued)

FOREIGN PATENT DOCUMENTS

JP   60 119195     6/1985
JP   63-224499 A   9/1988

(Continued)

OTHER PUBLICATIONS

Japanese Office Action Issued Jul. 3, 2012 in Patent Application No. 2011-500659 (with partial English translation).

(Continued)

*Primary Examiner* — Yuwen Pan
*Assistant Examiner* — Xin Jia
(74) *Attorney, Agent, or Firm* — Oblon, Spivak, McClelland, Maier & Neustadt, L.L.P.

(57) ABSTRACT

A wireless communication system including a master station, and slave stations that execute a predetermined operation based on an operation instruction transmitted by the master station, in which the master station includes a normal frame processor that generates an operation instruction, and a Go/Stop signal processor that generates an execution instruction signal instructing to execute the operation instruction to transmit the signal when a response to the operation instruction is obtained from all the slave stations during a predetermined response waiting time, each of the slave stations include an execution-instruction-signal receiving unit that receives the execution instruction signal, and the execution-instruction-signal receiving unit executes an operation corresponding to the execution instruction signal when receiving the execution instruction signal or waits execution of the corresponding operation until the execution instruction signal corresponding to the operation instruction is received.

18 Claims, 7 Drawing Sheets

(56) References Cited

U.S. PATENT DOCUMENTS

| | | | |
|---|---|---|---|
| 2004/0048569 A1* | 3/2004 | Kawamura | 455/41.1 |
| 2004/0213287 A1* | 10/2004 | Komori et al. | 370/466 |
| 2007/0277021 A1* | 11/2007 | O'Connor et al. | 712/208 |
| 2009/0138116 A1* | 5/2009 | Austin et al. | 700/108 |
| 2009/0273489 A1* | 11/2009 | Lu | 340/989 |

FOREIGN PATENT DOCUMENTS

| | | |
|---|---|---|
| JP | 63 54280 | 10/1988 |
| JP | 05 266395 | 10/1993 |
| JP | 8-106306 A | 4/1996 |
| JP | 8-125709 A | 5/1996 |
| JP | 11-167406 A | 6/1999 |
| JP | 2000 308259 | 11/2000 |
| JP | 2003 273876 | 9/2003 |
| JP | 2007 312043 | 11/2007 |
| JP | 2009-20547 A | 1/2009 |

OTHER PUBLICATIONS

Japanese Office Action Issued Dec. 4, 2012 in Patent Application No. 2011-500659 (with partial English translation).

International Search Report issued May 25, 2010 in PCT/JP10/052542 filed Feb. 19, 2010.

Chinese Office Action issued Aug. 2, 2013, in China Patent Application No. 201080008772.X (with Partial English Translation).

Office Action issued Apr. 16, 2013 in Japanese Patent Application No. 2011-500659 with English language translation.

* cited by examiner

TRANSMISSION ERROR ON WIRELESS SECTION

FIG.9

TRANSMISSION ERROR ON WIRELESS SECTION

WIRELESS COMMUNICATION SYSTEM, WIRELESS COMMUNICATION DEVICE, AND WIRELESS COMMUNICATION METHOD

FIELD

The present invention relates to a wireless communication system, a wireless communication device, and a wireless communication method that enable to operate a plurality of apparatuses in a coordinated manner with a predetermined period.

BACKGROUND

An FA (Factory Automation) environment system (FA system) includes a plurality of devices and a plurality of networks. The FA system includes devices such as a sensor, a robot, and a servomotor, and controllers that control these devices, for example. The FA system also includes plural networks such as an inter-controller network for sharing information among the controllers, an information network for sharing information among PCs (Personal Computers) and the controllers, a field network designed to connect the devices in a coordinated manner in real time, and a servo network designed to provide communication with higher speeds and higher reliability than in the field network to connect the devices faster.

Typical communication methods of the information network include Ethernet (registered trademark)/IP (Internet Protocol) and PROFInet, and typical communication methods of the inter-controller network includes MELSECNET and FL-net. The field network has typical communication methods such as CC-Link (Control & Communication Link) and Devicenet, and the servo network has typical communication methods such as SSCNET (Servo System Controller Network).

Among these methods, the field network and the servo network require high-speed and high-reliability communication as characteristics of the FA system. An industrial robot is cited as an example of the devices that configure the FA system. The industrial robot is operated through servo amplifiers and servomotors according to commands issued from a controller to execute operations such as expansion, contraction, bend, stretch, upward or downward movement, leftward or rightward movement, and turn. Two or more servo amplifiers and servomotors are sequentially operated in a predetermined procedure to realize complicated operations of the industrial robot.

An operation of a machine tool called "roll feeder" is explained as an example of the industrial robot. In the roll feeder, a feeder moves forward a roll placed on a base by adjusting the speed and a punch press descends at a position where the roll stops, thereby performing punching. In this example, a method is used in which instructions are issued from a controller through servo amplifiers to servomotors that drive the feeder moving the roll and the punch press performing punching, respectively. When precise machining is to be performed with respect to X, Y, and Z axes, a high-accuracy coordinated operation is required. Accordingly, synchronous communication between the controller and each servo amplifier or servomotor is periodically established to realize concurrent activation or high-accuracy coordinated operations among plural servos. To realize the high-accuracy coordinated operations, highly reliable communication needs to be performed.

Meanwhile, as a technique that provides highly reliable communication in a master/slave system, Patent Literature 1 mentioned below describes a technique that enables to, when there is no response from a slave to a wired bus network, detect abnormal communication and enter an operation mode at abnormal time in which the slave is disconnected, for example.

CITATION LIST

Patent Literature

Patent Literature 1: Japanese Patent Application Laid-open No. 2007-312043

SUMMARY

Technical Problem

However, the field network or the servo network of the conventional FA system uses metal cables or optical fiber cables as physical lines and assumes that no communication errors occur. If any communication error occurs in a case where a network having a plurality of slaves to be controlled assumes that the plural slaves operate in a coordinated manner, a master and all the slaves need to know the occurrence of the communication error. When the communication error cannot be detected and the operation is continued, not only damages of processed products but also breaking of the industrial robot itself or risks of human lives are expected. A case where a picture is drawn by issuing instructions to slaves that drive X, Y, and Z axes, respectively, is assumed, for example. When erroneous information is transmitted to the slave driving the Z axis to break through a plate that supports the machine and when this cannot be detected by the controller, not only the picture is not accurately drawn on a processed product but also the machine itself may be damaged.

However, in wired communication using the metal cables or the optical fiber cables, leading of physical lines is hard and, particularly when many devices are to be connected, the leading becomes a problem. It is thus desired to apply wireless communication to these networks. However, the conventional technique cannot deal with cases where communication errors occur because it is not designed for wireless communication.

Furthermore, the technique described in Patent Literature 1 is an abnormality detecting method designed for wired communication. When this is applied to wireless communication, whether lack of a response is caused by an instantaneous error of a communication quality or failure of the machine cannot be determined. Accordingly, this technique cannot be applied to wireless communication in which instantaneous communication interruption occurs.

The present invention has been achieved in view of the above problems, and an object of the present invention is to provide a wireless communication system, a wireless communication device, and a wireless communication method that enable to provide highly-reliable wireless communication in a control system that controls devices.

Solution to Problem

In order to solve the aforementioned problems and attain the aforementioned object, the wireless communication system is provided with: a master station, and slave stations that execute a predetermined operation based on an operation instruction transmitted by the master station, wherein the master station includes: a normal-frame transmitting unit that generates the operation instruction as a wireless frame; and an execution-instruction-signal generating unit that generates an execution instruction signal instructing to execute an operation corresponding to the operation instruction, to transmit the generated execution instruction signal when a response to the operation instruction is obtained from all the slave stations during a predetermined response waiting time, each of the slave stations includes: an execution-instruction-signal receiving unit that receives the execution instruction signal and performs predetermined reception processing, and the execution-instruction-signal receiving unit executes an operation based on an operation instruction corresponding to the execution instruction signal when receiving the execution instruction signal, or waits execution of the operation based on the operation instruction until the execution instruction signal corresponding to the operation instruction is received.

Advantageous Effects of Invention

According to the present invention, when a master transmits an operation instruction to slaves and receives responses from all the slaves within a predetermined period, the master instructs to execute an operation corresponding to the operation instruction. Therefore, highly-reliable wireless communication can be achieved.

DESCRIPTION OF EMBODIMENTS

Exemplary embodiments of a wireless communication system, a wireless communication device, and a wireless communication method according to the present invention will be explained below in detail with reference to the accompanying drawings. The present invention is not limited to the embodiments.

Embodiment

Figure 1:
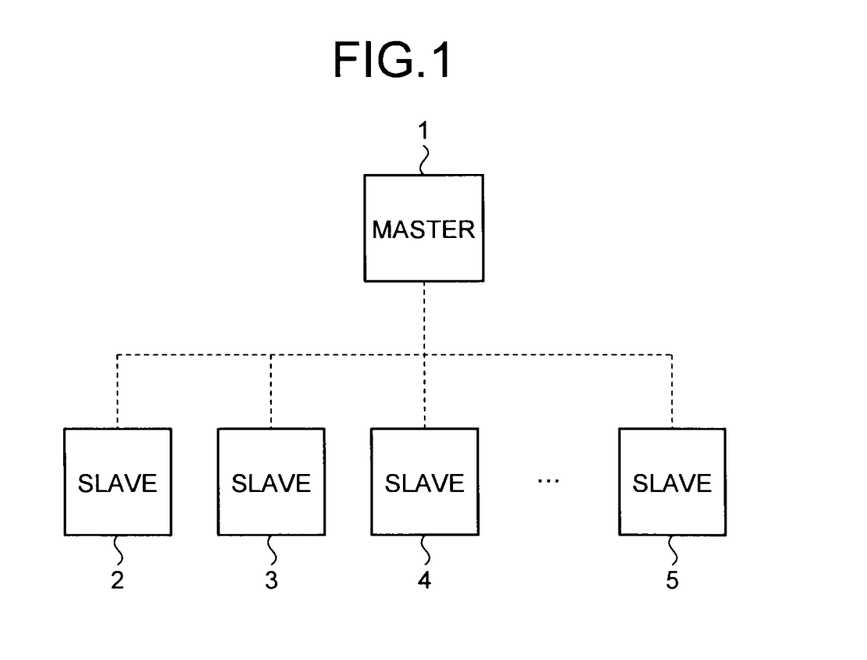
FIG. 1 is a configuration example of a communication system according to a first embodiment of the present invention.

FIG. 1 is a configuration example of a communication system according to the present invention. As shown in FIG. 1, the communication system according to the present embodiment includes a master 1, and slaves 2 to 5 which are devices to be controlled by the master 1. Regarding the slaves 2 to 5, it suffices that the communication system according to the present embodiment includes a plural number of slaves and there is no limitation on the number. It also suffices that the number of the master 1 is one or more and a plurality of the masters 1 can be provided.

Figure 2:
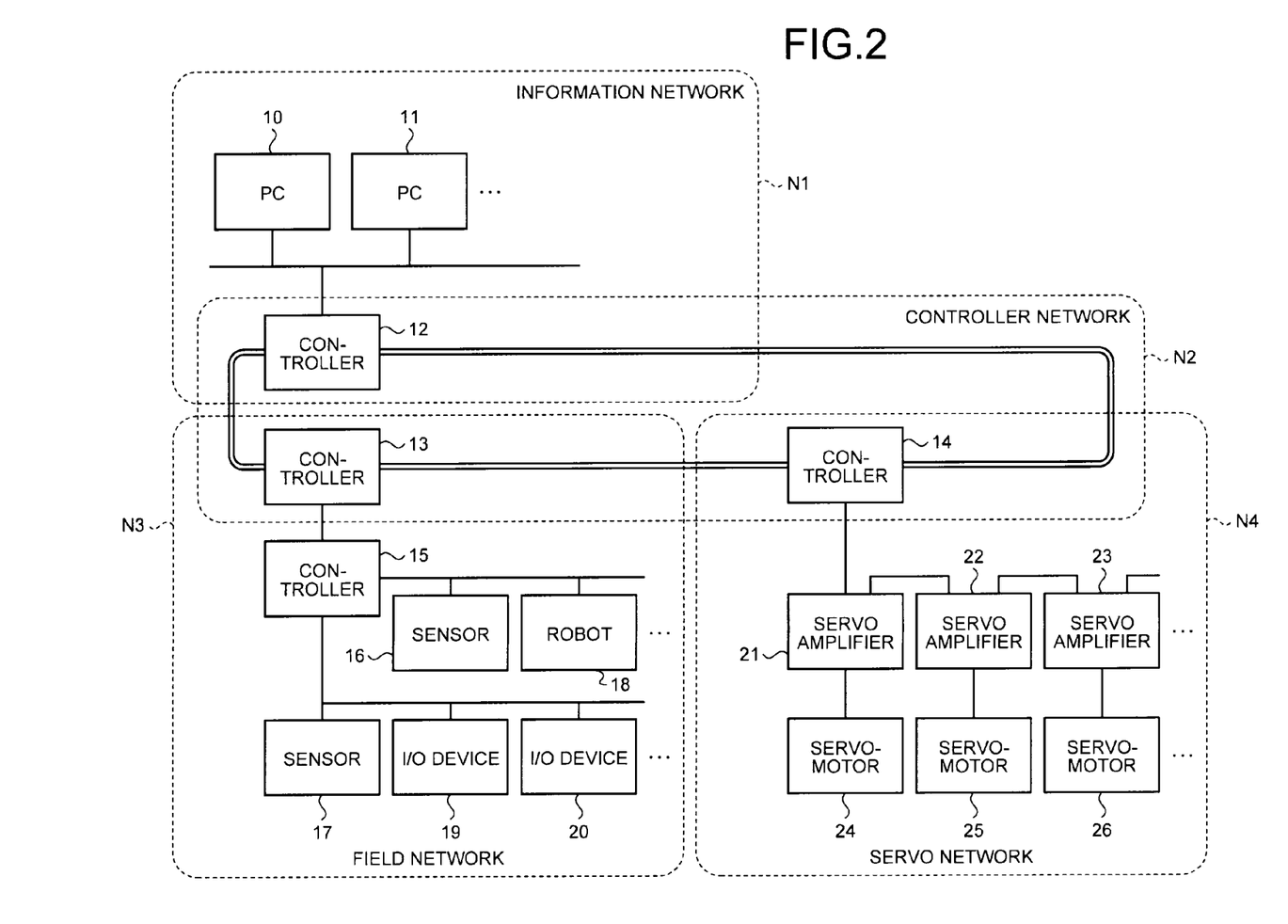
FIG. 2 is an example of an FA system.

The communication system according to the present embodiment can be used as a system included in a field network or a servo network in an FA system, for example. FIG. 2 is an example of the FA system. The FA system shown in FIG. 2 includes PCs (Personal Computers) 10 and 11 that perform information management of the FA system and the like, controllers 12 to 15, sensors 16 and 17, a robot 18, I/O devices (Inputs/Outputs) 19 and 20, servo amplifiers 21 to 23, and servomotors 24 to 26.

The controllers 12 to 15 control the sensors 16 and 17, the robot 18, the I/O devices 19 and 20, and the servo amplifiers 21 to 23 in a predetermined programmed procedure, and performs acquisition of information from these devices and the like. The controllers 12 to 15 use diverse positioning programs to perform advanced motion control such as a synchronous operation, position follow, and a tandem operation on the servomotors 24 to 26 through the servo amplifiers 21 to 23.

The sensors 16 and 17 are controlled by the controller 15 and supply the controller 15 with information. The robot 18 executes an operation based on a control instruction from the controller 15. The I/O devices 19 and 20 periodically input ON/OFF information or numerical information of each device based on a control instruction from the controller 15, or receive an input from an operator. The servo amplifiers 21 to 23 control operations of the servomotors 24 to 26 connected thereto, respectively, based on an instruction from the controller 14.

The servomotors 24 to 26 execute an operation by driving a motor using a position, orientation, attitude and the like of an object, as a control amount, based on instructions from the servo amplifiers 21 to 23 connected thereto, respectively. When a detection mechanism is provided, the detection mechanism detect the position, orientation, attitude and the like and feed back controls to the servo amplifiers 21 to 23 connected thereto, are performed respectively.

In the FA system shown in FIG. 2, an information network N1 for sharing information includes the PCs 10 and 11 and the controller 12, and an inter-controller network (controller network) N2 for sharing information among controllers includes the controllers 12 to 14. In the FA system shown in FIG. 2, a field network N3 for connecting devices in a coordinated manner in real time includes the controllers 13 and 15, the sensors 16 and 17, the robot 18, and the I/O devices 19 and 20, and a servo network N4 for performing higher-speed and higher-reliability communication than in the field network N3 to connect the devices faster includes the controller 14, the servo amplifiers 21 to 23, and the servomotors 24 to 26.

In this FA system, the sensors 16 and 17, the robot 18, the I/O devices (Inputs/Outputs) 19 and 20, the servo amplifiers 21 to 23, and the servomotors 24 to 26 often coordinate with each other to realize one operation. Therefore, when operation instructions from the controllers 12 to 15 do not reach even one of these devices due to a transmission error, for example, the coordinated operation cannot be performed and an operation intended by the FA system such as high-accuracy position control cannot be realized. Accordingly, it is important in the FA system to reliably transmit the operation instructions from the controllers 12 to 15.

The communication system according to the present embodiment assumes application to a system that requires reliability in transmission of instructions from a device as a master, such as the field network N2 or the servo network N4 shown in FIG. 2. For example, the communication system shown in FIG. 1 corresponds to the field network N2 or the servo network N4 shown in FIG. 2, and includes devices serving as masters (the controllers 13 to 15) and devices serving as slaves (such as the sensors 15 and 16, the robot 18, the I/O devices 19 and 20, the servo amplifiers 21 to 23, the servomotors 24 to 26), in which the masters control operations of the slaves.

Figure 3:
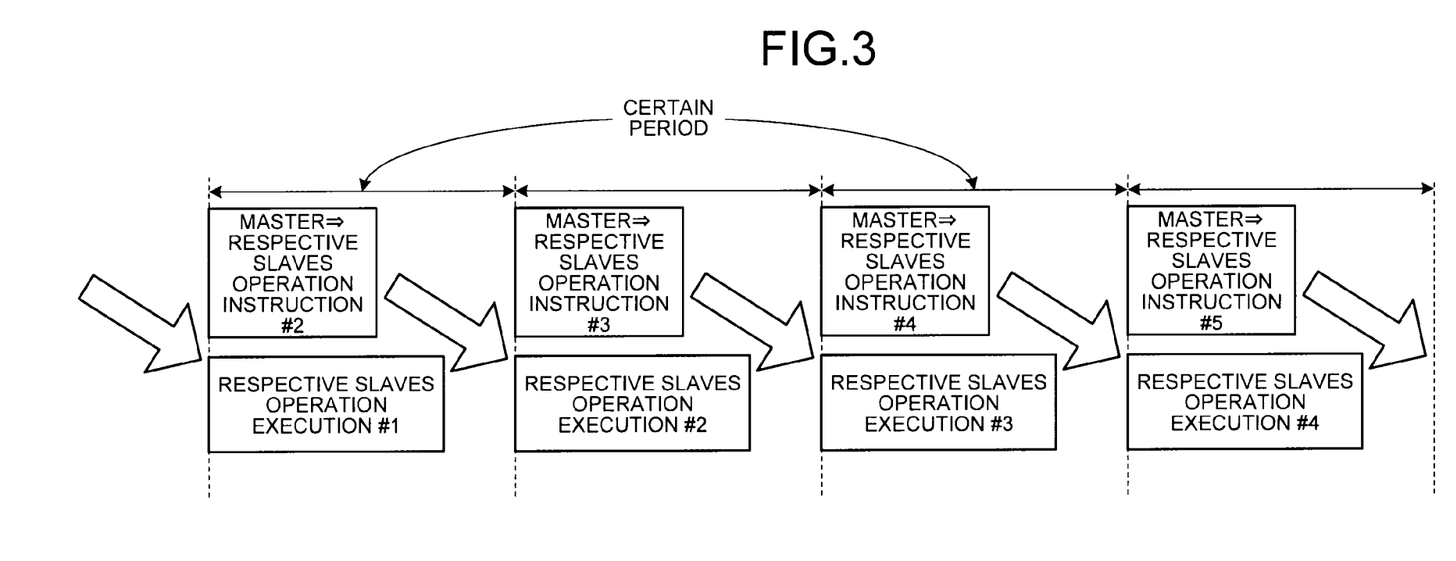
FIG. 3 depicts a concept of a basic operation of a master/slave system assumed in the first embodiment.

An operation of the present embodiment is explained below. FIG. 3 depicts a concept of a basic operation of a master/slave system assumed in the present embodiment. As shown in FIG. 3, a master issues an instruction to respective slaves with a certain period. Upon receipt of the instruction, the respective slaves execute an operation based on the instruction during the next period (a period subsequent to a period in which the master has issued the instruction). Specifically, in a period in which the master transmits an operation instruction #2, for example, the slaves execute an operation based on an operation instruction #1 received in the previous period as shown in FIG. 3. In the next period, the master transmits an operation instruction #3 and the slaves 2 to 5 execute an operation based on the operation instruction #2. In this way, by the execution of the operations of the slaves based on the instructions from the master, a coordinated operation of the slaves is realized in the entire system.

Figure 4:
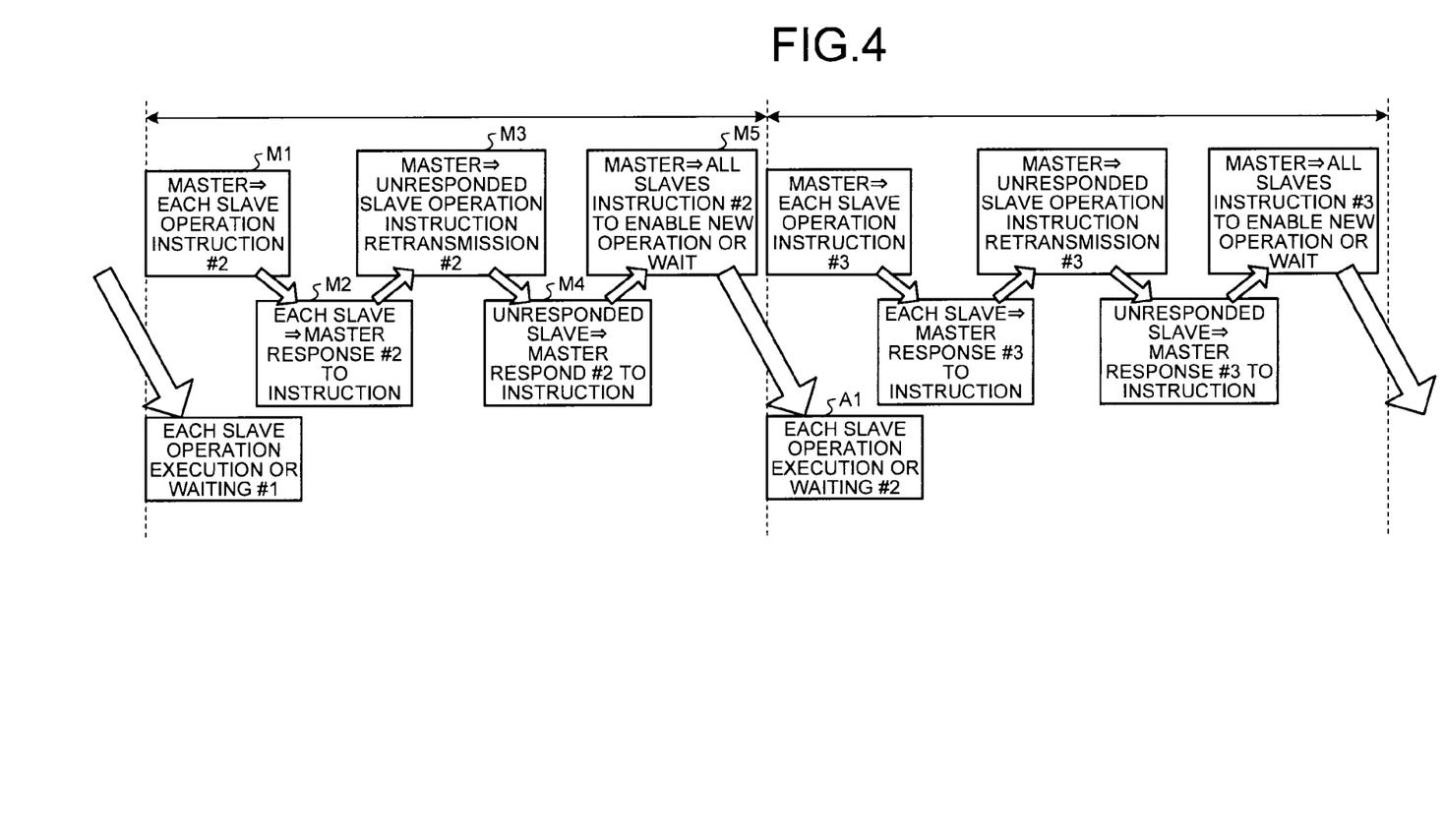
FIG. 4 depicts a concept of an operation in which wireless communication is established.

While the basic operation based on the assumption that wired communication is established is shown in FIG. 3, this basic operation is applied to wireless communication in the present embodiment. FIG. 4 depicts a concept of an operation of the present embodiment in which wireless communication is established. Wireless messages M1 to M5 are transmitted or received between the master 1 and the slaves 2 to 5. The wireless messages M1, M3, and M5 are transmitted from the master 1 to the slaves 2 to 5; and the wireless messages M2 and M4 are transmitted from the slaves 2 to 5 to the master 1. An operation A1 indicates an operation performed by the slaves 2 to 5.

The wireless message M1 is a message from the master 1 to notify the slaves 2 to 5 of details of the operation instruction. The wireless message M2 is a message from the slaves 2 to 5 that have received the wireless message M1 to notify the master 1 of the fact that the details of the operation instruction have reached. When the slaves 2 to 5 have not properly received the wireless message M1 due to a communication error, it means that the wireless message M2 as a response of the wireless message M1 is not returned. There is also a case where a transmission error occurs when the slaves 2 to 5 transmit the wireless message M2.

The wireless message M3 is a message for retransmitting the operation instruction to a slave (unresponded slave) from which the response to the wireless message M1 has not been properly returned to the master. The wireless message M4 is a message transmitted from the unresponded slave as a response to the wireless message M3, when the wireless message M3 has been received. It is also assumed that a transmission error may occur during transmission of the wireless message M3 or M4. In such a case, retransmission may be repeated.

In the present embodiment, the transmission and the retransmission of the operation instructions from the master 1 as described above, is performed within a certain period or a certain cycle. When there is a slave that does not return a response to the operation instruction including a response to the retransmission within the period in which the operation instruction has been transmitted; the master 1 transmits the wireless message M5 instructing to wait the operation to all the slaves 2 to 5. When the slaves are instructed to wait, a waited operation instruction will be retransmitted during the next period. When obtaining responses to the operation instruction including responses to the retransmission, from all the slaves within the period in which the operation instruction has been transmitted; the master 1 instructs to execute the operation with the wireless message M5.

In the next period, the respective slaves 2 to 5 execute the operation or wait (wait without executing the operation instructed with the wireless message M1 or the retransmitted message) based on the wireless message M5. Details of the operation to be executed at that time have been notified with the wireless message M1 or the retransmitted message. When the respective slaves 2 to 5 cannot receive the wireless message M5, that is, when there is neither instruction of operation execution nor instruction of waiting, the respective slaves perform waiting.

In the present embodiment, it is assumed that the wireless messages M1 to M4 configure a wireless LAN (Local Area Network), or a general wireless frame of portable phones and the like. Accordingly, a reception SNR (Signal to Noise Ratio) of a predetermined level or above is required to establish communication. Meanwhile, the wireless message M5 is generated as a message that can be received even when the reception SNR is 20 to 30 decibels lower than that required for the wireless messages M1 to M4 because it suffices that the wireless message M5 is a wireless signal sequence (signal 0 or 1) indicating either operation execution or waiting. The wireless message M5 is not limited thereto and can be transmitted with reliability improved by repeatedly transmitting a normal wireless frame, enhancing the transmission power, using a plurality of antennas, employing a lower modulation method, or increasing error correction capability. The wireless message M5 can be also transmitted with reliability improved by combining these methods.

The operation of the present embodiment described above enables to reach the instructions from the master 1 to all the slaves 2 to 5 within a certain period, even when the wireless communication with a high error rate is used. Further, because all the slaves 2 to 5 are caused to wait the operation, when reception of notification cannot be confirmed in one or more of the slaves 2 to 5, a coordinated operation is not hindered.

Figure 5:
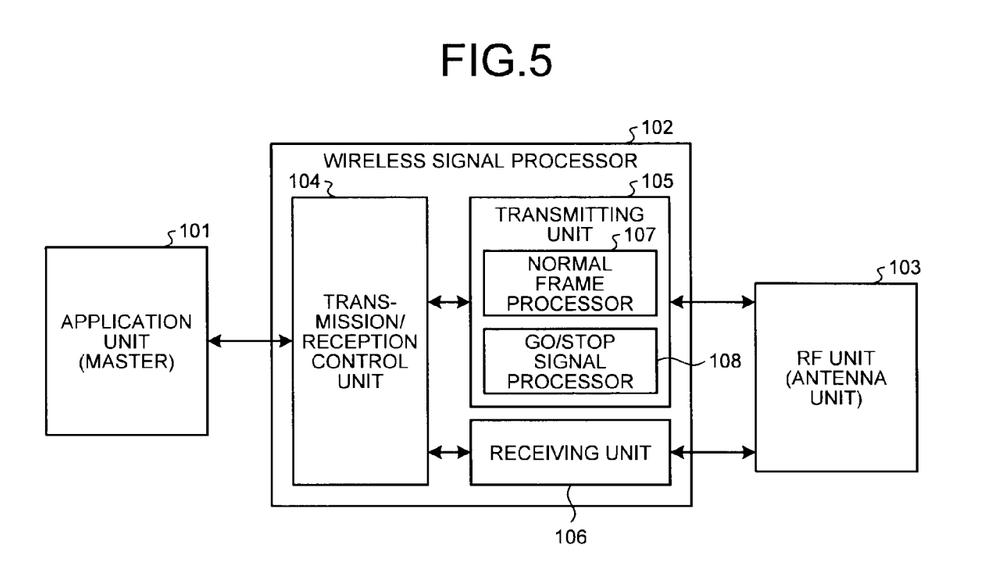
FIG. 5 is a functional configuration example of a master.

FIG. 5 is a functional configuration example of the master 1 according to the present embodiment. As shown in FIG. 5, the master 1 includes an application unit (master) 101 that generates an instruction or information to the slaves 2 to 5 or extracts information from the slaves 2 to 5; a wireless signal processor 102 that generates a transmission signal based on the instruction or information generated by the application unit (master) 101 or performs reception processing to a wireless signal transmitted from the slaves 2 to 5; and an RF (Radio Frequency) unit (antenna unit) 103 that performs transmission or reception of the wireless signal.

Further, the wireless signal processor 102 includes a transmission/reception control unit 104 that controls timing of transmission or reception; a transmitting unit 105 that generates the transmission signal based on the instruction or information generated by the application unit 101; and a receiving unit 106 that processes a reception signal. The transmitting unit 105 includes a normal frame processor 107 that generates a normal wireless frame for transmitting a message based on the instruction or information generated by the application unit 101; and a Go/Stop signal processor 108 that generates a Go signal instructing the slaves 2 to 5 to execute an operation or a Stop signal instructing the slaves 2 to 5 to wait.

The receiving unit 106 performs predetermined reception processing to a reception signal, which is the wireless signal received by the RF unit 103, to obtain reception data and transfers the reception data to the transmission/reception control unit 104. The receiving unit 106 performs control of the RF unit 103 such as increasing/decreasing in the reception power, frequency switching, or switching of an antenna to reception. The transmission/reception control unit 104 determines start timing for transmitting the instruction or information to the slaves 2 to 5, notifies the transmitting unit 105 of control information such as a destination address, and transfers the instruction or information generated by the application unit (master) 101 to the transmitting unit 105. The instruction includes an instruction as to which of operation execution or waiting, is to be transmitted with the wireless message M5. The transmission/reception control unit 104 transfers the reception data to the application unit (master) 101.

The application unit (master) 101 determines whether there is an unresponded slave based on the reception data in units of periods, thereby determining whether to transmit operation execution or waiting with the wireless message M5. When there is an unresponded slave after the operation instruction has been transmitted within one period as described above, retransmission is tried and, when there is a slave that does not respond also to the retransmission, it is determined that there is an unresponded slave. It is determined to instruct with the wireless message M5 to execute the operation when there is no unresponded slave, and to instruct with the wireless message M5 to wait when there is an unresponded slave.

In the transmitting unit 105, when receiving from the transmission/reception control unit 104 information or an instruction to be transmitted with a normal wireless frame such as the wireless message M1 or M3, the normal frame processor 107 creates a wireless frame based on the information or instruction and transfers the wireless frame to the RF unit 103 as a transmission signal. The normal wireless frame can be a TDD (Time Division Duplex) or FDD (Frequency Division Duplex) frame of a single carrier, such as PDC (Personal Digital Cellular), PHS (Personal Handy-phone System), or DSRC (Dedicated Short Range Communication); or a CSMA (Carrier Sense Multiple Access), TDD, or FDD frame of OFDM (Orthogonal Frequency Division Multiplexing) or OFDMA (Orthogonal Frequency Division Multiplexing Access) such as wireless LAN 802.11a or WiMax (Worldwide Interoperability for Microwave Access). It suffices that the normal wireless frame has an address structure for specifying a destination and has a frame configuration highly modulated to achieve efficient transmission.

When the instruction as to whether the operation execution (Go) or waiting (Stop) is to be transmitted with the wireless message M5 is received from the transmission/reception control unit 104, the Go/Stop signal processor 108 generates a transmission signal for the wireless message M5 based on the instruction and transfers the generated signal to the RF unit 103. Because the transmission signal for the wireless message M5 includes a small number of bits to be transmitted, it is unnecessary to set a higher transmission efficiency of the information and the transmission signal is generated as a signal having resistance for noises or interference signals. For example, the transmission signal is generated as a signal of a spread spectrum (SS) method such as direct sequence (DS) or frequency hopping (FH). The transmitting unit 105 also performs control of the RF unit 103 such as increasing/decreasing in the transmission power, frequency switching, or switching of an antenna to transmission.

Figure 6:
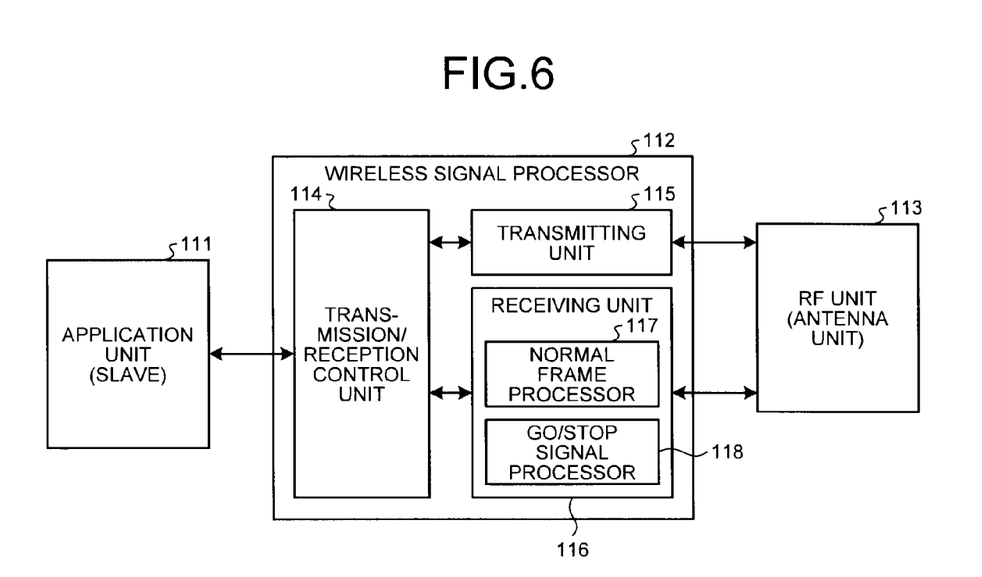
FIG. 6 is a functional configuration example of slaves.

FIG. 6 is a functional configuration example of the slaves 2 to 5 according to the present embodiment. As shown in FIG. 6, each of the slaves 2 to 5 includes an application unit (slave) 111 that executes an operation upon receipt of the instruction or information from the master 1 or collects information to be transmitted to the master 1; a wireless signal processor 112 that converts the information collected by the application unit (slave) 111 into a transmission signal or performs predetermined transmission or reception; and an RF unit (antenna unit) 113.

The wireless signal processor 112 further includes a transmission/reception control unit 114 that controls timing of transmission or reception, a transmitting unit 115 that generates the transmission signal, and a receiving unit 116 that processes a reception signal. The receiving unit 116 includes a normal frame processor 117 that processes a normal frame including a message; and a Go/Stop signal processor 118 that processes a Go signal instructing the slave to execute an operation or processes a Stop signal instructing the slave to wait.

The RF unit 113 receives the wireless signal transmitted from the master 1 that has received to transfer the wireless signal to the receiving unit 116, or transmits the transmission signal generated by the transmitting unit 115 as a wireless signal. In the receiving unit 116, when the reception signal received from the RF unit 113 is a normal wireless frame, the normal frame processor 117 performs predetermined reception processing to the reception signal to obtain reception data, and transfers the reception data to the transmission/reception control unit 114. When the reception signal received from the RF unit 113 is the wireless message M5, the Go/Stop signal processor 118 performs predetermined reception processing corresponding to the message and executes an operation based on the message. Specifically, when the instruction of the wireless message M5 is operation execution, the Go/Stop signal processor 118 instructs the application unit (slave) 111 to execute an operation via the transmission/reception control unit 114. When the instruction of the wireless message M5 is waiting, the Go/Stop signal processor 118 instructs the application unit (slave) 111 to wait via the transmission/reception control unit 114. The receiving unit 116 instructs the RF unit 113 to perform increasing/decreasing in the reception power, frequency switching, or switching of an antenna to reception.

The transmission/reception control unit 114 specifies control information, such as start timing to transmit a response or information from the slave itself to the master 1, or a destination address, to the transmitting unit 115 and specifies start timing of reception to the receiving unit 116. The transmission/reception control unit 114 receives the reception data or the instruction of the operation execution or waiting from the receiving unit 116 to be transferred to the application unit (slave) 111 and transfers the instruction or information generated by the application unit (slave) 11 to the transmitting unit 115.

The application unit (slave) 111 performs predetermined processing based on the instruction or information, which is transmitted from the application unit (master) 101 of the master 1 and received via the transmission/reception control unit 114, or generates the instruction or information to be transmitted to the master 1.

The transmitting unit 115 creates a wireless frame based on the instruction or information received from the transmission/reception control unit 114, and transfers the frame as the transmission signal to the RF unit 113. The transmitting unit 115 instructs the RF unit 113 to perform increasing/decreasing in the transmission power, frequency switching, or switching of an antenna to transmission.

Figure 7:
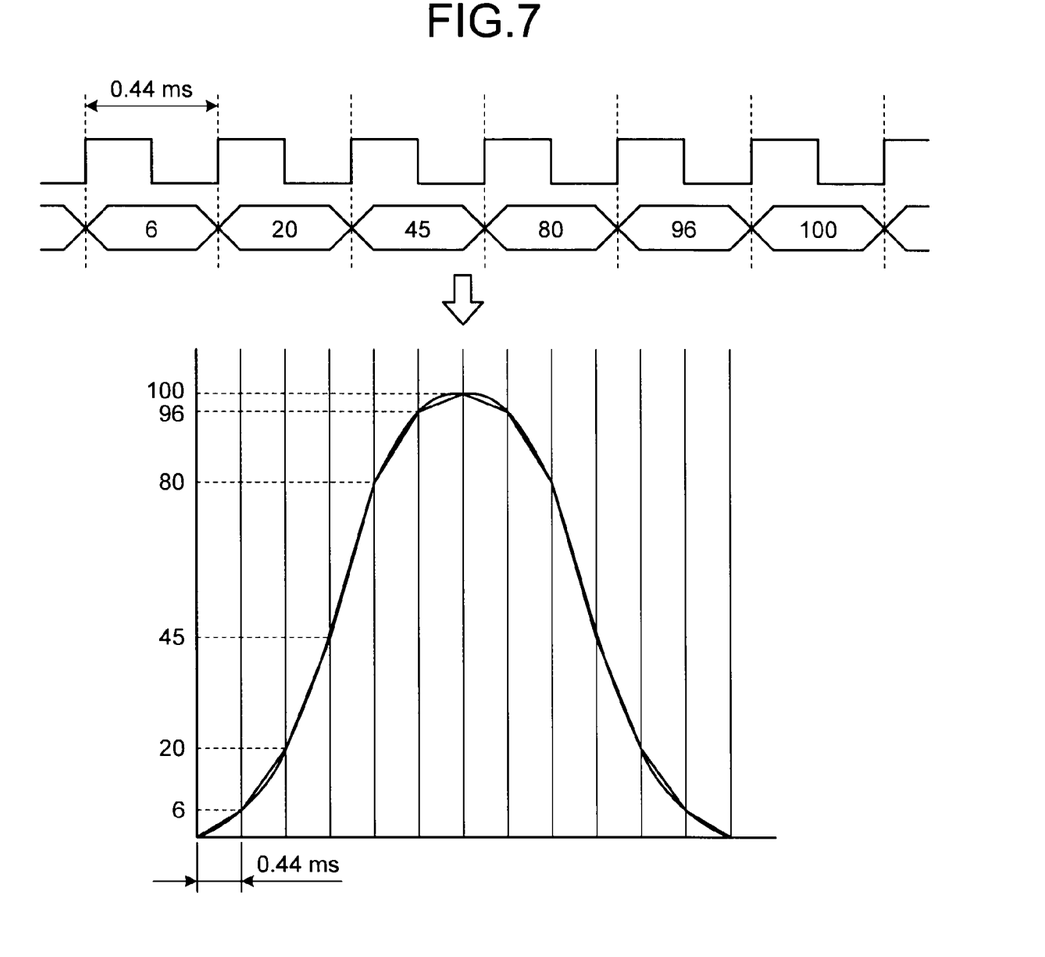
FIG. 7 depicts a concept of transmission of instructions from the master to the slaves, and a device operation.

A device operation applied with the operation of the communication system according to the present embodiment is explained next. FIG. 7 depicts a concept of transmission of instructions from the master 1 to the slaves 2 to 5, and a device operation. In an example shown in FIG. 7, a period in which operation instructions from the master 1 are transmitted is 0.44 millisecond. It is assumed in this example that instructions on a motor position as the operation instructions are specified by numerical values, and numerical values such as "6", "20", and "45" in FIG. 7 are example of the instructions. A graph at a lower part in FIG. 7 shows positions of a motor driven every 0.44 millisecond. For example, when "6" is specified in the operation instruction at an upper part in FIG. 7, a slave that is adapted to drive the motor and receives the instruction smoothly moves the motor so that the position of the motor becomes "6" in the next period. When receiving an operation instruction that specifies a position "20" within the period in which the motor is moved to be located at the position "6", the slave adapted to drive the motor smoothly moves the motor so that the position of the motor becomes "20" in the next period. FIG. 7 depicts a case where there is no transmission error during the periods (a case where the wireless message M5 instructs to execute the operation).

Figure 8:
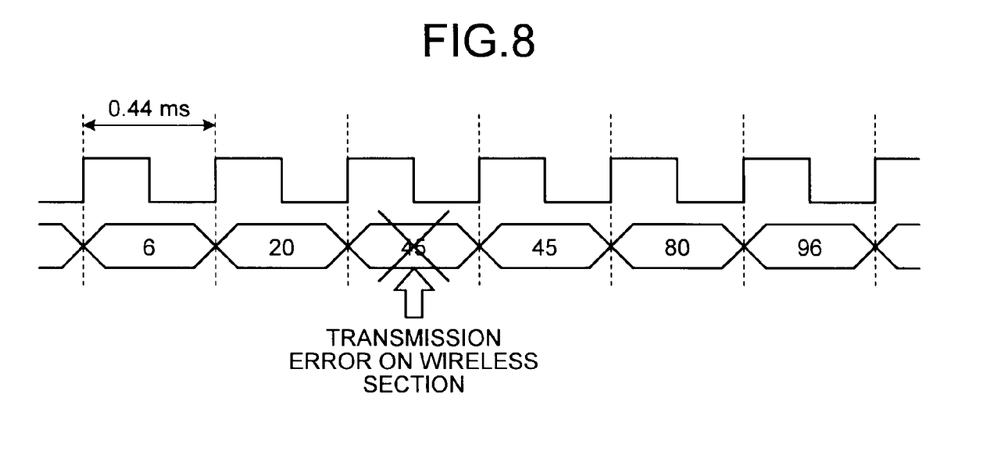
FIG. 8 is an example of operation instructions including a transmission error.

FIG. 8 is an example of operation instructions including a transmission error. While the example shown in FIG. 8 is a case where the same operation as that in FIG. 7 is to be performed, it is assumed that a transmission error on a wireless section occurs in an operation instruction for specifying a position "45" of the motor. In this case, waiting is specified with the wireless message M5 by performing the operation of the present embodiment described above. An operation instruction for specifying the position "45" of the motor is then retransmitted in the next period. The example in FIG. 8 shows a case where transmission is performed properly in the period subsequent to the waiting.

Figure 9:
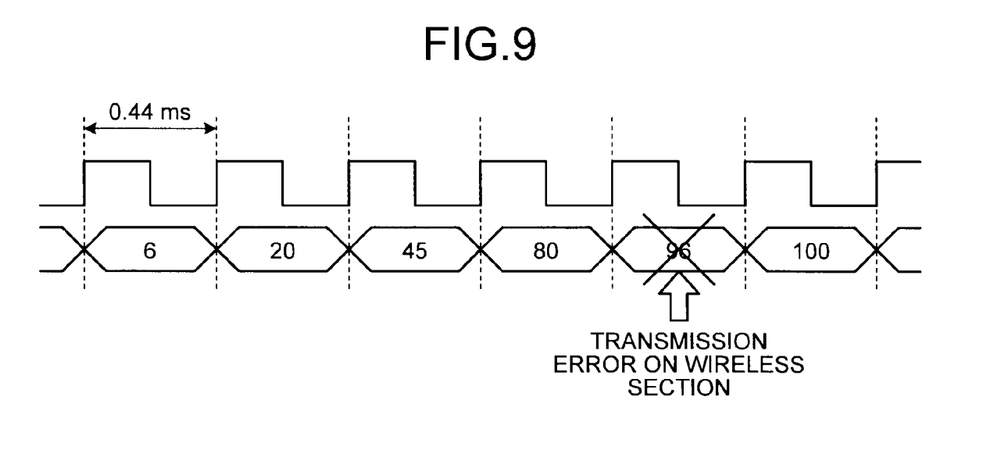
FIG. 9 is another example of operation instructions including a transmission error.

While the waited operation instruction is retransmitted in the period subsequent to the waiting in the example shown in FIG. 8, the waited instruction can be discarded to transmit a next operation instruction. FIG. 9 is another example of operation instructions including a transmission error. The example shown in FIG. 9 assumes that a transmission error on a wireless section occurs in an operation instruction for specifying a position "96" of the motor. In this example, the specification of the position "96" of the motor is not retransmitted in a period subsequent to waiting of the operation but an operation instruction for specifying a position "100" of the motor is transmitted as a next operation instruction.

When responses from all the slaves have been obtained during a certain period, it is possible to transmit in the period, an operation instruction to be issued in the next period to effectively use a communication band.

In the present embodiment, the case where the master 1 transmits the operation instructions to the slaves 2 to 5 with a predetermined period has been explained. However, the present invention is not limited thereto, and the wireless message M5 explained in the present embodiment can be transmitted also when the operation instructions are to be transmitted irregularly. In such a case, whether there is an unresponded slave is not determined within a period in which the operation instruction has been transmitted. For example, a predetermined response waiting time is defined and the wireless message M5 can be transmitted based on whether there are responses (responses to retransmission) from the slaves within the response waiting period after transmission of the operation instruction. In this case, an operation waiting time when the slaves wait the operations is previously defined.

As described above, in the present embodiment, the master 1 transmits the operation instruction to the slaves 2 to 5 with a predetermined period. Retransmission is performed within the same period when there is a slave that does not respond thereto, and all the slaves are instructed to wait the operation when there is a slave that does not respond to the operation instruction or does not respond to the retransmitted operation instruction within the period. When responses are obtained from all the slaves within the period, the slaves are instructed to execute the operation. Accordingly, also when communication between the master 1 and the slaves 2 to 5 is wireless communication, high reliability is achieved and instructions can be certainly provided to the plural slaves.

Further, the normal communication data are generated as a signal with high transmission efficiency, and a message instructing to wait the operation or execute the operation is generated as a signal having resistance to noises or interference signals; or the message is retransmitted to achieve the resistance to noises or interference signals. Therefore, high transmission efficiency can be realized and high reliability can be realized.

INDUSTRIAL APPLICABILITY

As described above, the wireless communication system, the wireless communication device, and the wireless communication method according to the present invention are useful for a system in which a plurality of devices to be controlled by a controller operate in a coordinated manner, and are particularly suitable for a system used in FA environments.

REFERENCE SIGNS LIST

1 MASTER
2 to 5 SLAVE
10, 11 PC
12 to 15 CONTROLLER
16, 17 SENSOR
18 ROBOT
19, 20 I/O DEVICE
21 to 23 SERVO AMPLIFIER
24 to 26 SERVOMOTOR
101 APPLICATION UNIT (SLAVE)
102, 112 WIRELESS SIGNAL PROCESSOR
103, 113 RF UNIT
104, 114 TRANSMISSION/RECEPTION CONTROL UNIT
105, 115 TRANSMITTING UNIT
106, 116 RECEIVING UNIT
107, 117 NORMAL FRAME PROCESSOR
108, 118 Go/Stop SIGNAL PROCESSOR
111 APPLICATION UNIT (SLAVE)
A1 OPERATION
M1 to M5 WIRELESS MESSAGE
N1 Information Network
N2 Controller Network
N3 Field Network
N4 Servo Network

The invention claimed is:
1. A wireless communication system comprising a master and slaves,
wherein the master includes:
a normal-frame transmitting unit that generates a wireless frame indicating an operation instruction for each of the slaves, and transmits the generated wireless frame to each of the slaves; and
an execution-instruction-signal generating unit that generates, when responses to the transmitted wireless frame are obtained from all of the slaves within a predetermined response waiting time, an execution instruction signal instructing each of the slaves to execute an operation corresponding to the operation instruction indicated by the wireless frame, and transmits the thus generated execution instruction signal to each of the slaves, each of the slaves includes:

an execution-instruction-signal receiving unit that receives the wireless frame indicating the operation instruction and the execution instruction signal and performs predetermined reception processing, and wherein the execution-instruction-signal receiving unit waits execution of the operation corresponding to the operation instruction indicated by the received wireless frame until the execution instruction signal is received, and executes the operation when the execution instruction signal is received.

2. The wireless communication system according to claim 1, wherein the execution instruction signal is generated by a method in which a required reception signal-to-noise ratio (SNR) is lower than that of a method in which the normal-frame transmitting unit generates the wireless frame.

3. The wireless communication system according to claim 2, wherein the method of generating the execution instruction signal is a method in which a required SNR is lower than that of the method in which the normal-frame transmitting unit generates the wireless frame by a range equal to or higher than 20 decibels and equal to or lower than 30 decibels.

4. The wireless communication system according to claim 1, wherein the execution-instruction-signal generating unit repeatedly transmits the execution instruction signal a predetermined number of times.

5. The wireless communication system according to claim 1, wherein when transmitting the execution instruction signal, the execution instruction-signal generating unit sets a transmission power higher than that in a case where the wireless frame generated by the normal-frame transmitting unit is transmitted.

6. The wireless communication system according to claim 1, wherein the execution-instruction-signal generating unit generates, when a response to the transmitted wireless frame is not obtained from at least one of the slaves within the predetermined response waiting time, a waiting instruction signal instructing each of the slaves to wait execution of the operation corresponding to the operation instruction indicated by the wireless frame, and transmits the generated waiting instruction signal to each of the slaves, and the execution-instruction-signal receiving unit waits execution of the operation corresponding to the operation instruction indicated by the received wireless frame when receiving the waiting instruction signal.

7. The wireless communication system according to claim 6, wherein the waiting instruction signal is generated by a method in which a required reception SNR is lower than that of a method in which the normal-frame transmitting unit generates the wireless frame.

8. The wireless communication system according to claim 7, wherein the method of generating the waiting instruction signal is a method in which a required SNR is lower than that of the method by which the normal-frame transmitting unit generates the wireless frame by a range equal to or higher than 20 decibels and equal to or lower than 30 decibels.

9. The wireless communication system according to claim 6, wherein the execution-instruction-signal generating unit repeatedly transmits the waiting instruction signal a predetermined number of times.

10. The wireless communication system according to claim 6, wherein when transmitting the waiting instruction signal, the execution-instruction-signal generating unit sets a transmission power higher than that in a case where the wireless frame generated by the normal-frame transmitting unit is transmitted.

11. The wireless communication system according to claim 1, wherein when a response to the transmitted wireless frame indicating the operation instruction is not obtained from at least one of the slaves, the normal-frame transmitting unit retransmits the wireless frame indicating the operation instruction to the at least one slave from which the response is not obtained.

12. The wireless communication system according to claim 1, wherein the normal-frame transmitting unit transmits operation instructions with a predetermined transmission period, and the predetermined response waiting time is equal to or shorter than the predetermined transmission period.

13. The wireless communication system according to claim 1, wherein when a response to the transmitted wireless frame indicating the operation instruction is not obtained from at least one of the slaves within the predetermined response waiting period, the normal-frame transmitting unit transmits another wireless frame indicating the same operation instruction at a next transmission period.

14. The wireless communication system according to claim 1, wherein when a response to the transmitted wireless frame indicating the operation instruction is not obtained from at least one of the slaves within the predetermined response waiting period, the normal-frame transmitting unit transmits another wireless frame indicating a subsequent operation instruction at a next transmission period.

15. A wireless communication device operating as two or more slaves, the wireless communication device comprising an execution-instruction signal receiving unit that receives, from a master, a wireless frame and an execution instruction signal and performs predetermined reception processing, the wireless frame indicating an operation instruction for the wireless communication device, the execution instruction signal instructing the wireless communication device to execute an operation corresponding to the operation instruction indicated by the wireless frame, wherein the execution-instruction-signal receiving unit waits execution of the operation corresponding to the operation instruction indicated by the received wireless frame until the execution instruction signal is received, and executes the operation when the execution instruction signal is received.

16. The wireless communication system according to claim 1, wherein the slaves operate together in a coordinated manner based on the operation instruction indicated by the wireless frame transmitted from the master.

17. A wireless communication device in a wireless communication system comprising a master and slaves the wireless communication device operating as the master and comprising:

a normal-frame transmitting unit that generates a wireless frame indicating an operation instruction for each of the slaves, and transmits the generated wireless frame to each of the slaves; and an execution-instruction-signal generating unit that generates, when responses to the transmitted wireless frame are obtained from all of the slaves within a predetermined response waiting time, an execution instruction signal instructing each of the slaves to execute an operation corresponding to the operation instruction indicated by the wireless frame, and transmits the thus generated execution instruction signal to each of the slaves.

18. The wireless communication device according to claim 15, wherein, when the execution-instruction-signal receiving unit receives the wireless frame indicating the operation instruction, a message from the wireless communication device is sent to the master to notify the master that the wireless frame indicating the operation instruction has been received.

* * * * *